(12) United States Patent  (10) Patent No.: US 7,717,452 B2
Cook  (45) Date of Patent: May 18, 2010

(54) TRACTOR TRAILER DOLLY JOCKEY

(76) Inventor: Glen Edward Cook, 89 Prospect St., Simpson, PA (US) 18407

( * ) Notice: Subject to any disclaimer, the term of this patent is extended or adjusted under 35 U.S.C. 154(b) by 4 days.

(21) Appl. No.: 11/977,989

(22) Filed: Oct. 26, 2007

(65) Prior Publication Data

US 2008/0106064 A1 May 8, 2008

Related U.S. Application Data

(60) Provisional application No. 60/857,103, filed on Nov. 4, 2006.

(51) Int. Cl.
*B60D 1/36* (2006.01)
*B66F 15/00* (2006.01)
(52) U.S. Cl. .................. 280/477; 254/131
(58) Field of Classification Search ............ 280/477; 254/131
See application file for complete search history.

(56) References Cited

U.S. PATENT DOCUMENTS

| 300,968 | A | * | 6/1884 | Hatfield | 81/13 |
|---|---|---|---|---|---|
| 357,644 | A | * | 2/1887 | Tucker | 7/138 |
| 853,840 | A | * | 5/1907 | Taylor, Jr. | 254/44 |
| 1,317,145 | A | * | 9/1919 | Skantz | 254/120 |
| 2,832,628 | A | * | 4/1958 | Turnbull | 294/17 |
| 3,744,758 | A | * | 7/1973 | Nakasone | 254/129 |
| 4,738,462 | A | * | 4/1988 | Adams | 280/407 |
| 5,348,332 | A | * | 9/1994 | Hamilton | 280/476.1 |
| 5,423,567 | A | * | 6/1995 | Upton | 280/433 |
| 5,425,154 | A | * | 6/1995 | Edwards, Jr. | 16/436 |
| D377,924 | S | * | 2/1997 | Christensen | D12/161 |
| 6,092,437 | A | * | 7/2000 | Sumner | 74/544 |
| 6,279,932 | B1 | * | 8/2001 | White et al. | 280/149.2 |
| 6,354,642 | B1 | * | 3/2002 | Haggerty | 294/19.1 |
| 6,375,162 | B1 | * | 4/2002 | Johnson | 254/131 |
| 6,951,332 | B2 | * | 10/2005 | Zimmerman | 254/131 |
| 7,347,467 | B2 | * | 3/2008 | Theobald | 294/24 |
| 2003/0201651 | A1 | * | 10/2003 | Lockhart | 294/17 |

* cited by examiner

*Primary Examiner*—Lesley Morris
*Assistant Examiner*—Daniel Yeagley

(57) ABSTRACT

Disclosed is a tool to help move and connect a tractor trailer dolly to the lead trailer in a safe, easy and efficient manner. The dolly jockey is a bar about three feet long with lips at the bottom to connect to the safety chain mounting ring on the rear of trailers. The bar has one or more hooks that connect to a chain with a hook at the end. The chain is connected between the dolly and the bar. The bar is used as a pry bar to pull the trailer towards the lead trailer. The bar can also be used to pry the front of the dolly from side to side in order to line it up with the lead trailer hitch.

4 Claims, 1 Drawing Sheet

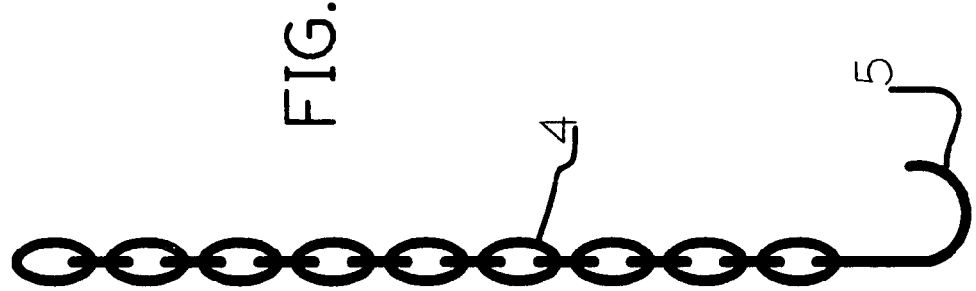
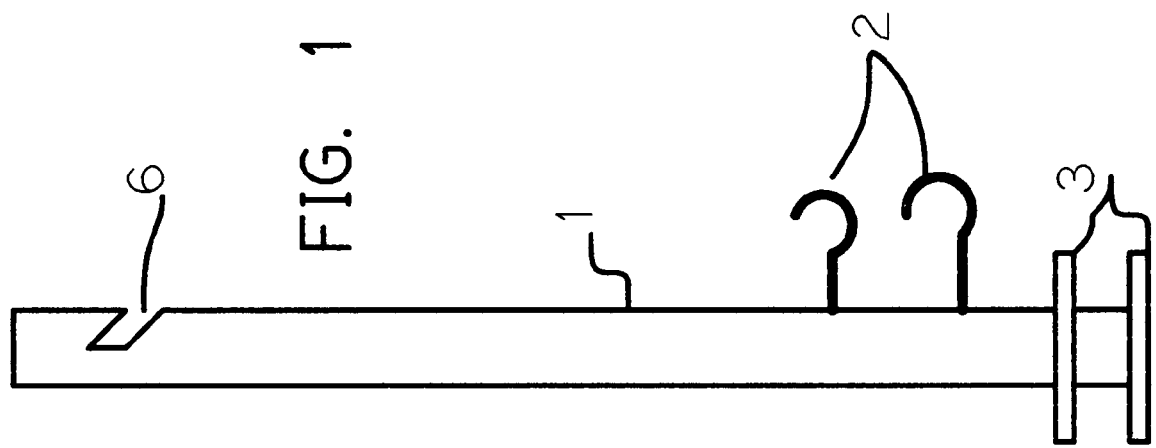

TRACTOR TRAILER DOLLY JOCKEY

CROSS-REFERENCE TO RELATED APPLICATIONS

This patent application is related to the U.S. Patent Application Ser. No. 60/857103 dated Nov. 04, 2006 titled "Tractor trailer dolly jockey" and assigned to the invention.

FEDERALLY SPONSORED RESEARCH

None.

SEQUENCE LISTING

None.

FIELD OF THE INVENTION

This invention relates to a tool to help move and couple double trailers, also called "twins." In the trucking industry many companies use double or triple trailers. This operation requires one tractor to be connected to two or more trailers. The trailers are connected together with a dolly. A dolly generally consists of one or more axles with duel wheels on each side, a fifth wheel similar to the one on the tractor to connect to the king pin of the trailing trailer, a hitch or strong steel ring to connect to the leading trailer and often a retractable landing gear with a wheel at the bottom.

In order to connect a set of trailers with a dolly, first: the rear trailer is dropped with its landing gear down. Second: a dolly is staged in front of the trailer with the fifth wheel centered and close to the rear trailer. The dolly can be moved into place by hand or with a tractor with a special hook on the rear to connect to the dolly. Most tractors used to pull doubles have this hook installed. Third: the tractor is hooked to the lead trailer and backed into position in front of the dolly. When the driver thinks he has backed the trailer so the trailer hook is lined up with the dolly, he must stop the tractor and walk to the rear of the leading trailer to check its position and connect the dolly to the lead trailer. When the connection is not close the driver must go back to the tractor and try again. If the trailer hook is close to the dolly, the driver can move the dolly by hand into position and hook them together; however, when the ground is not smooth and level, moving the dolly by hand can be impossible. The dolly must be hooked to the lead trailer before it is backed under and connected to the rear trailer.

In real life, the trailers are often connected in dark, unlevel, dirt and pothole filled yards where moving the dolly by hand is impossible. In this case the driver must continue to try to back the trailer to the dolly perfectly. Even the best drivers often take several tries to accomplish this task. This task is often a cause of injury as drivers try to move the dolly by hand. Even when a driver can move the dolly, the driver must hold the dolly in place with one hand while raising the landing gear to lower the dolly in place.

With over ten years in the industry, I have not seen or heard of any device to help line up or move a dolly by hand. What is needed is a device that can be carried inside a tractor that will allow a person to move a dolly as easy as a jack can lift a car to change a flat tire.

SUMMARY OF THE INVENTION

In view of the proceeding problems moving a dolly by hand, the general purpose of this invention is to provide a device that will allow a person to move and hold in place with one hand, a dolly while connecting it to the leading trailer.

The present invention provides a dolly jockey comprising of two parts: first, a strong metal bar about one inch in diameter and about three feet long. The bottom end would have a notch or two lips spaced apart slightly more than the thickness of the safety chain mounting ring used on the rear of trailers. The bar would have one or more open hooks near the bottom but above the rings. These hooks would be for connecting a chain to the bar. Secondly the unit would comprise, a chain about three feet long with a hook at one end.

To use the dolly jockey, a person would insert the bottom of the bar into the safety chain ring at the rear of the trailer. The lips on the dolly jockey bar must be one above the safety chain ring and one below to hold the bar from moving up or down while under pressure. The top of the bar must slant towards the rear trailer. The hook end of the chain should be hooked to the dolly and the other end to the dolly bar hook. The chain link that will make the chain the tightest must be used. When the top of the bar is pushed towards the lead trailer the chain will pull the dolly to the lead trailer with many times the force applied by the operator. This operation can be repeated until the dolly is at the proper distance from the lead trailer. When the dolly is at the proper distance, the front of the dolly can be moved sideways to line up the dolly with the trailer hook by moving the bar sideways wedging it against the front of the dolly. The bar can then be held in place with one hand while lowering the dolly in place with the other hand.

DRAWINGS

FIG. 1 is a side view of the dolly jockey bar.
FIG. 2 is a side view of the chain and hook.

DRAWING—Reference Numerals 1 bar
2 hook
3 lip
4 chain
5 chain hook
6 handle hook

DETAILED DESCRIPTION

The present invention comprises a strong bar 1 about one inch in diameter and about three feet high. The bar 1 has two lips 3 near the bottom. The lips 3 are spaced about two inches apart. The space between the lips 3 must be greater than the diameter of the safety chain mounting ring on the trailers the dolly jockey will be used on. There are one or more open hooks 2 near the bottom of the bar 1. When more than one hook 2 is used the hooks 2 should be spaced about two inches apart. There is a handle hook 6 near the top of the bar 1. The handle hook 6 is a notch cut into the bar 1 at an angle. The notch must be wide enough for a fifth wheel release handle will fit inside.

The invention also comprises of a length of chain 4 about three feet long with an open chain hook 5 at one end. The links in the chain 4 must be able to fit around the open hooks 2 on the bar 1.

Operation

To use the dolly jockey we first insert the bottom of the bar 1 into the lead trailer's safety chain mounting ring so the bar 1, lips 3 are one below and one above the safety chain mounting ring. The top of the bar 1 is tilted towards the rear trailer in a near horizontal position. The chain hook 5 is hooked to the dolly. The chain 4 is then connected to one of the open hooks 2 on the bar 1. The chain 4 must be hooked by the link that will cause the chain to be stretched as tightly as possible. The top of the bar 1 is then moved with force up towards the lead trailer to a near vertical position. This action will put pressure on the chain 4 that will pull the dolly closer to the lead trailer. The pull on the chain 4 will be much greater than the pressure applied to the top of the bar 1 because of the leverage. This can be repeated until the dolly is the proper distance from the lead trailer. The dolly can now be moved from side to side in order to line up the dolly ring to the dolly hook on the rear of the lead trailer. This is done by moving the top of the bar 1 to the right or left as needed, pushing on the nose of the dolly with the bar 1 with the lower end of the bar 1 engaged in the trailer safety chain mounting ring. The bar 1 can then be held in place with one hand while the other hand is free to lower the dolly onto the trailer dolly hook.

The handle hook 6 is used to as an extension to the fifth wheel handle on the tractor or the dolly to make it easer to pull. When you hook the dolly jockey to the fifth wheel handle you can pull the handle by pulling the dolly jockey.

What I claim as my invention is:

1. A tool to line up a trailer dolly with a lead trailer when connecting a set of double trailers using the trailer safety chain connecting ring located on the back of the lead trailer as a connection point to mount the lower end of a dolly jockey to form a multi directional pivot point; comprising:
   a. a strong, round. rigid, straight, bar at least thirty four inches long with two round, strong, rigid, flat washers fastened securely in place perpendicular to said bar and extending outward a minimum of one inch with one at the bottom end to form a bottom lip and another about two inches above to form a top lip;
   Wherein the bottom of the said bar is placed inside the safety chain ring on the rear of the lead trailer so the two said washers form a multidirectional pivot point around the safety chain connection ring and the upper section of said bar can rest against the nose of the dolly and push the front of the dolly sideways to line up with the pin hook of the lead trailer.

2. The tool to line up a trailer dolly with a lead trailer when connecting a set of double trailer of claim 1, wherein the top of said bar has a notch near the top of said bar cut into said bar at an angle extending towards the top of said bar about one half inch wide extending about half way to the center of said bar to hook onto a fifth wheel release handle or other part of the trailer to act as an extension handle.

3. A tool to line up a trailer dolly with a lead trailer when connecting a set of double trailers using the trailer safety chain connecting ring located on the back of the lead trailer as a connection point to mount the lower end of a dolly jockey to form a multi directional pivot point, comprising:
   a. a strong, round. rigid, straight, bar at least thirty four inches long with two round, strong, rigid, flat washers fastened securely in place perpendicular to said bar and extending outward a minimum of one inch with one at the bottom end to form a bottom lip and another about two inches above to form a top lip;
   b. one or more open chain hooks mounted directly, securely and very close to said bar near the bottom and above the said washers with the open side of said hooks facing the top of said bar;
   c. a length of chain that can connect to said hooks on said bar to allow the said chain to be adjustable by selecting the link to connect to said hook;
   d. a chain hook mounted on one end of said chain;
   Wherein the said chain hook mounted on the said chain can be connected directly to the dolly or the said chain can be wrapped around part of the dolly and the said chain hook can be connected to said chain and the other end of said chain could be connected to one of the said hooks on said bar so the said chain is as tight as possible while the said bar is in a near horizontal position with the top of said bar towards the dolly and the said washers are around the safety chain ring to form a multidirectional pivot point so when the top of the said bar is raised the said chain will pull and move the dolly towards the lead trailer and the said bar can be moved sideways to rest on the nose of the dolly and push it sideways to align the dolly front to back and sideways to line the dolly up with the trail pin hook.

4. A tool to line up a trailer dolly with a lead trailer when connecting a set of double trailers using the trailer safety chain connecting ring located on the back of the lead trailer as a connection point to mount the lower end of a dolly jockey to form a multi directional pivot point, comprising:
   a. a strong, round. rigid, straight, bar at least thirty four inches long with two round, strong, rigid, flat washers fastened securely in place perpendicular to said bar and extending outward a minimum of one inch with one at the bottom end to form a bottom lip and another about two inches above to form a top lip;
   b. one or more open chain hooks mounted directly, securely and very close to said bar near the bottom and above the said washers with the open side of said hooks facing the top of said bar;
   c. length of chain that can connect to said hooks on said bar to allow the said chain to be adjustable by selecting the link to connect to said hook;
   d. a chain hook mounted on one end of said chain;
   e. a notch near the top of said bar cut into said bar at an angle extending towards the top of said bar about one half inch wide extending about half way to the center of said bar;
   Wherein the said chain hook can be connected directly to the dolly or the said chain can be wrapped around part of the dolly and the said chain hook can be connected to said chain and the other end could be connected to one of the said hooks on said bar so the said chain is as tight as possible while the said bar is in a near horizontal position with the top of said bar towards the dolly and the said washers are around the safety chain ring to form a multidirectional pivot point so when the top of the said bar is raised the said chain will pull and move the dolly towards the lead trailer and the said bar can be moved sideways to rest on the nose of the dolly and push it sideways to align the dolly front to back and sideways to line the dolly with the trailer pin hook.

* * * * *